3,156,650

OXIDE COATED IRON-COBALT ALLOY MAGNETIC MATERIAL

Richard B. Falk, Greenville, Mich., assignor to General Electric Company, a corporation of New York No Drawing. Filed Nov. 17, 1960, Ser. No. 69,810
5 Claims. (Cl. 252—62.5)

This invention relates to magnetic material comprising single domain magnetic particles of iron, cobalt and oxygen.

Copending application Serial No. 500,078, filed April 8, 1955, assigned to the same assignee as this invention and now U.S. Patent 2,974,104, discloses magnetic materials comprising elongated, single domain magnetic particles of iron or iron and cobalt. The elongated, single domain magnetic particles are prepared by electrolytically depositing iron or iron-cobalt alloys into a liquid metal cathode, such as mercury, under quiescent interface conditions between the cathode and the electrolyte. To optimize the magnetic properties, the electrodeposited particles of iron or iron and cobalt are heat-treated at temperatures up to 300° C. The elongated particles are then coated with tin or other suitable coating material to increase the coercive force of the particles and to protect them from oxidation. The thus prepared materials possess outstanding magnetic properties, but their coercive force is not as high as other magnetic material such as the barium ferrites.

It is a principal object of this invention to provide permanent magnetic materials of single domain magnetic particles of iron and cobalt having a coercive force higher than has heretofore been obtainable with such particles, without sacrifice of the remaining properties of the magnetic materials.

It has now been discovered that oxidized, single domain magnetic particles of iron and cobalt possess both high saturation magnetization, as well as the high coercive force typical of the ferrites. The oxidized, single domain magnetic particles of this invention possess coercive forces ranging as high as 1800 to 2250 oersteds at room temperature in their uncompacted state. Compacted magnets prepared from the oxidized, single domain magnetic particles have been found to have coercive forces of from 1200 to 1800, and generally over 1500, oersteds and maximum energy products as high as 4 million gauss-oersteds. Both the coercive force and the maximum energy product of magnets prepared in accordance with this invention exceed the similar values for iron or iron-cobalt magnets prepared in accordance with the teachings of the aforementioned U.S. Patent 2,974,104.

The magnetic materials of the present invention comprise fine particles having a coercive force at room temperature in excess of 1800 oersteds in their uncompacted state, each of said particles having a core of an alloy of iron and cobalt and a coating surrounding said core of an oxide of iron and cobalt, the dimensions of each of said particles being that of a single magnetic domain. The increased coercive force of the magnetic materials of this invention are believed to result from the crystal anisotropy contribution of the iron-cobalt oxide coating. This conclusion is based upon the fact that the coercive force of magnets made with the present magnetic materials is relatively constant with increasing packing fraction, a characteristic typical of magnetic materials depending upon crystal rather than shape anisotropy for their magnetic properties. In addition, the coercive force changes approximately 25% over the range from −196° C. to room temperature. On the other hand, the coercive force of magnetic materials depending upon shape anisotropy ordinarily changes very little as the coercive force is measured over the same temperature range. In view of the dependence of the present magnetic matrials upon crystal rather than shape anisotropy, it is not ncessary that the present particles be elongated in order to obtain maximum coercive force, although the ratio of residual induction ($B_r$) to intrinsic saturation induction ($B_{is}$) is greater for elongated particles and thus the latter have a higher maximum energy product.

In general, the magnetic materials of the present invention are prepared by electrolytically depositing fine particles into a liquid metal cathode from an electrolyte comprising iron and cobalt ions. The electrodeposited particles are placed in an oxidizing environment and reacted with oxygen to form particles consisting essentially of single domain magnetic particles having a core of an alloy of iron and cobalt and a coating surrounding said core of an oxide of iron and cobalt. Prior to oxidation the particles should not be coated with tin or other coating materials as taught in the above referred to U.S. Patent 2,974,104. It is preferred that the interface between the cathode and the electrolyte be maintained quiescent during the electrode deposition procedure. By maintaining a quiescent interface, elongated rather than spheroidal particles will be produced and the former are the preferred configuration of particles constituting the magnetic material of this invention. The oxidized particles may then be directly compacted into permanent magnets.

Both electron diffraction and X-ray analysis substanstiate the presence of two phases in the oxidized particles —a core composed of a solid solution of iron and cobalt and a shell composed of an iron-cobalt spinel oxide. The particles may be oxidized by a variety of methods, and precise times, oxidizing conditions or temperatures cannot therefore be given. However, the oxidation should be carried out until the particles possess a coercive force at least 500 oersteds in excess of that of the corresponding unoxidized particles of pure iron and cobalt when measured at −196° C. The oxygen content of the particles with such an increase in coercive force will vary from about 10 to 15% by weight of the total weight of the particles. Optimum magnetic properties exist with about 12 to 13% oxygen. While improved coercive force is obtained with any proprtions of cobalt and iron, the intrinsic saturation magnetism of the magnetic materials decreases with increased cobalt content. Moreover, the greater relative cost of cobalt as compared with iron would ideally point to the use of as little cobalt as possible. Optimum proportions of cobalt have been found to be from about thirty to fifty-five per cent cobalt based on the weight of the iron and cobalt before oxidation.

The electrolyte used for electrodeposition of the iron-cobalt particles may consist of the soluble bivalent salts of iron and cobalt, suitable examples of which are iron or cobalt sulfate or chloride. The pH of the electrolyte should be made acidic with, for example, sulfuric or hydrochloric acid, and a preferred pH is approximately 2. The anode may either be a consumable anode such as pure iron or pure cobalt, or a cobalt-iron alloy, or it may be a non-consumable anode of an inert material such as platinum, lead or graphite. The cathode is a liquid metal, preferably mercury.

The current density may be varied over a wide range. It will generally be lower than the current density employed to electroplate particles which are not intended to be oxidized. Current densities varying from 3 amps./sq. ft. to 80 amps./sq. ft have been found to produce particles having a coercive force in their compacted state in excess of 1500 oersteds. Ordinarily, the higher the current density, the shorter the time of deposition. A current density of 10 to 20 amps./sq. ft. for 200 to 480 minutes has been found to produce optimum magnetic properties, although acceptable results have been achieved over a wide range of current densities and times. The following Table I records properties of magnetic materials prepared in accordance with the practice of the present invention, deposited at various current densities and at various times. The *Br/Bis* ratio and coercive force (H*ci*) results are given for the unoxidized particles, the oxidized but uncompacted particles and the pressed or compacted magnets. The unoxidized particles were heat-treated, coated with tin to optimize their magnetic properties and then re-heat-treated. The *Br/Bis* ratio represents the alignment of the particles. A ratio of 1.00 represents perfect alignment. Maximum magnet energy (BH max.) is also given for pressed, oxidized magnets. The measurements at −196° C. were necessary to freeze the mercury in the as plated samples to lock the particles in place.

TABLE I

| Current Density and Time | Unoxidized (−196° C.) | | Oxidized (−196° C.) | | Oxidized (25° C.) | | Pressed (25° C.) | | |
|---|---|---|---|---|---|---|---|---|---|
| | Br/Bis | Hci | Br/Bis | Hci | Br/Bis | Hci | Br/Bis | Hci | (BH) max. |
| 3 amp./sq. ft., 360 min | .880 | 1,680 | .875 | 2,495 | .860 | 2,125 | .858 | 1,525 | $3.04 \times 10^6$ |
| 20 amp./sq. ft., 400 min | .855 | 1,820 | .862 | 2,550 | .836 | 2,095 | .824 | 1,500 | $3.30 \times 10^6$ |
| 30 amp./sq. ft., 160 min | .880 | 1,800 | .883 | 2,445 | .864 | 2,100 | .853 | 1,650 | $3.33 \times 10^6$ |
| 8 amp./sq. ft., 300 min | .878 | 1,870 | .886 | 2,400 | .863 | 2,100 | .844 | 1,550 | $3.68 \times 10^6$ |
| 10 amp./sq. ft., 480 min | .914 | 1,810 | .913 | 2,550 | .902 | 2,245 | .898 | 1,690 | $3.95 \times 10^6$ |
| 80 amp./sq. ft., 20 min | .870 | 1,740 | .885 | 2,400 | .858 | 1,912 | .866 | 1,700 | $2.88 \times 10^6$ |
| 15 amp./sq. ft., 200 min | .903 | 1,845 | .882 | 2,475 | .873 | 2,072 | .880 | 1,600 | $4.00 \times 10^6$ |
| 25 amp./sq. ft., 60 min | .908 | 1,800 | .911 | 2,495 | .897 | 2,100 | .884 | 1,650 | $3.70 \times 10^6$ |
| 70 amp./sq. ft., 150 min | .875 | 1,780 | .824 | 2,460 | .825 | 2,085 | .826 | 1,575 | $3.20 \times 10^6$ |
| 12 amp./sq. ft., 60 min | .885 | 1,870 | .875 | 2,440 | .852 | 2,090 | .882 | 1,600 | $3.33 \times 10^6$ |

The ratio of iron to cobalt ions will depend, of course, upon the desired iron-cobalt composition of the electrodeposited particles. In addition, both current density and electrolyte temperature affect the composition of the electrodeposited particles. The following Table II records the results with a series of electrodeposited particles prepared from varying electrolyte compositions with the indicated resultant percentage of cobalt in the iron-cobalt plated fine particles. Room temperatures of 20° to 30° C. are ordinarily used for electrodeposition and were used in obtaining the following results, although other temperatures may, of course, be used if suitable adjustments are made in the remaining conditions of the electrodeposition process.

*Table II*

| Wt. Percent Cobalt Ions in Electrolyte | Current Density, Amp./Sq.Ft. | Wt. Percent Cobalt in Deposited Particles |
|---|---|---|
| 11.5 | 2.5 | 39 |
| 12 | 5 | 35 |
| 19 | 10 | 41 |
| 20 | 20 | 35 |
| 19 | 40 | 30 |
| 20 | 80 | 28 |

After electrodeposition is completed, the iron-cobalt particle-mercury slurry is heat-treated to eliminate the dendritic branches and to enlarge the diameter of the particles thereby increasing their coercive force. The heat treatment may vary from about 5 to 20 minutes, with the temperature varying up to 300° C. but preferably at about 200° C.

Following the heat-treating steps, the mercury and iron-cobalt particles may, if desired, be concentrated as, for example, magnetically, to remove excess mercury. The particles are then placed in an oxidizing environment. The oxidizing environment may simply consist of air, and preferably moist air. In view of the extremely small size of the particles, they will readily oxidize even in the ambient atmosphere and sufficient oxidation will take place in such an atmosphere if the time of exposure is sufficiently long. One method of oxidizing the particles is to place the electroplated and heat-treated particles in a closed container with a fresh air intake and outlet. The air may be bubbled through water prior to passage through the intake to increase the humidity and thus promote oxidation.

In place of moist air oxidation, the particles may be oxidized in the presence of a chemical oxidizing agent by covering the mercury-iron-cobalt particles with a solution of the chemical oxidizing agent. Chemical oxidizing agents found to prove satisfactory are potassium dichromate, both concentrated and dilute, potassium permanganate, and hydrogen peroxide. Other oxidizing agents will readily occur to those skilled in the art. In the case of chemical oxidizing agents, the oxidizing times have been found to be somewhat less than the oxidizing times in moist air, as would have been expected. In general, the optimum oxidation time in moist air appears to range from 96 to 240 hours, with 240 hours proving to yield the optimum magnetic properties, although the changes taking place in magnetic properties after 96 hours of oxidation are found to be small. In the case of chemical oxidation, the optimum oxidizing time appears to be between 48 and 72 hours.

After oxidation is completed, any residual mercury may be removed from the oxidized particles, either mechanically by flotation, or by vacuum distillation. The particles may be concentrated mechanically in view of the fact that the oxidized particles are not wet by the mercury, as is the case with unoxidized particles, and therefore float to the surface of the mercury when the required degree of oxidation has o ccurred. Vacuum separation can be accomplished by distilling off the mercury in the presence of a vacuum for periods ranging from 4 to 8 hours.

After the mercury has been removed from the oxidized iron-cobalt particles and the powder has been dried, the powder may then be compacted in a non-magnetic die while aligned in the presence of a D.C. field to form a finished magnet. Optimum magnetic properties will be obtained if the powder is directionalized or aligned prior to compaction. The quantity of pressure used in compacting the fine particle magnetic materials has a great effect on the resulting magnetic properties of the compact. By increasing the pressure, the intrinsic saturation induction, residual induction, and the maximum energy product all increase. The compacting pressure may range as high as 50 tons/sq. in or even higher. Very small decreases in coercive force occur as the packing fraction increases.

The following example illustrates the preparation of a permanent magnet in accordance with the practice of this invention. All parts and percentages are by weight, unless otherwise indicated.

*Example 1*

Iron-cobalt particles were electrodeposited into a mercury cathode using an electrolyte of ferrous and cobaltous sulfate containing about 17% $Co^{++}$ ions, 83% $Fe^{++}$ ions. The anode was a vacuum cast alloy containing 67% iron and 33% cobalt. The electrolyte had a pH of 2 and a molarity of 1.6. Using a current density of 15 amps./sq. ft., plating was continued for a period of three hours and twenty minutes while maintaining a quiescent interface between cathode and electrolyte. The plated particles had a composition of 67% iron and 33% cobalt. The resulting particle-mercury slurry was concentrated magnetically to a concentration of 4.0% iron-cobalt particles. The concentrated slurry was heat-treated for 12 minutes at 200° C. The coercive force of the heat treated particles was 1845 oersteds at −196° C. after coating with tin and heat-treating an additional ten minutes. The Br/Bis ratio was 0.903 at −196° C.

Particles which were heat-treated but not coated were placed in a closed container with a fresh air intake and outlet. Air was bubbled through water before passing into the air intake to increase the humidity. The moist air was passed through the container for 144 hours. The oxidized particles were then dried residual mercury by vacuum distillation for 8 hours at 250° C. and a pressure of 1 mm. of mercury. After removal of the mercury, magnets were pressed at 40 tons/sq. in. in a D.C. field in excess of 3000 gauss. The resulting magnets had a maximum magnetic energy of $4.00 \times 10^6$ gauss-oersteds and a coercive force of 1600 oersteds when measured at 25° C.

The fine particle magnetic material may, if desired, be compacted into its final magnet shape with an organic binder, a suitable example of which is a vinyl alcohol-acetate resin. If a binder is added, the binder should be added after the fine particles have been oxidized and the mercury removed. Compacted permanent magnets of the present fine particles are stable indefinitely at temperatures below 100° C. The loose, uncompacted particles have been found to increase their oxygen content less than 1% when stored in moist air for 800 hours at room temperatures.

What I claim as new and desire to secure by Letters Patent of the United States is:

1. Magnetic material comprising fine particles, each of said particles consisting essentially of a core of an alloy of iron and cobalt and a coating surrounding said core of an oxide of iron and cobalt, the iron being present in the approximate range of 45 to 70 percent based on the combined weight of the iron and cobalt, the dimensions of each of said particles being that of a single magnetic domain, said magnetic material having a coercive force in excess of 1800 oersteds at room temperature.

2. Magnetic material comprising fine particles, each of said particles consisting essentially of a core of an alloy of iron and cobalt and a coating surrounding said core of an oxide of iron and cobalt, the iron being present in the approximate range of 45 to 70 percent based on the combined weight of the iron and cobalt, each of said particles being elongated and having a transverse dimension of a single magnetic domain and at least half of said particles having elongation ratios of at least 2:1, said magnetic material having a coercive force in excess of 1800 oersteds at room temperature.

3. Magnetic material comprising fine particles, each of said particles consisting essentially of a core of an alloy of iron and cobalt and a coating surrounding said core of an oxide of iron and cobalt, the oxygen content of said particles being about 10 to 15 percent by weight of the total weight of the particles, the iron being present in the approximate range of 45 to 70 percent based on the combined weight of the iron and cobalt, each of said particles being elongated and having a transverse dimension of a single magnetic domain and at least half of said particles having elongation ratios of at least 2:1, said magnetic material having a coercive force in excess of 1800 oersteds at room temperature.

4. A permanent magnet structure comprising aligned and compacted fine particles, each of said particles consisting essentially of a core of an alloy of iron and cobalt and a coating surrounding said core of an oxide of iron and cobalt, the iron being present in the approximate range of 45 to 70 percent based on the combined weight of the iron and cobalt, the dimensions of each of said particles being that of a single magnetic domain, said permanent magnet structure having a coercive force in excess of 1200 oersteds at room temperature.

5. A permanent magnet structure comprising aligned and compacted fine particles, each of said particles consisting essentially of a core of an alloy of iron and cobalt and a coating surrounding said core of an oxide of iron and cobalt, the oxygen content of said particles being about 10 to 15 percent by weight of the total weight of the particles, the iron being present in the approximate range of 45 to 70 percent based on the combined weight of the iron and cobalt, each of said particles being elongated and having a transverse dimension of a single magnetic domain and at least half of said particles having elongation ratios of at least 2:1, said permanent magnet structure having a coercive force in excess of 1200 oersteds at room temperature.

References Cited in the file of this patent

UNITED STATES PATENTS

| | | |
|---|---|---|
| 1,651,958 | Lowry | Dec. 6, 1927 |
| 2,575,099 | Crowley | Nov. 13, 1951 |
| 2,626,895 | Balke | Jan. 27, 1953 |
| 2,824,052 | Czech | Feb. 18, 1958 |
| 2,974,104 | Paine et al. | Mar. 7, 1961 |

FOREIGN PATENTS

| | | |
|---|---|---|
| 1,168,240 | France | Aug. 25, 1958 |